United States Patent [19]
Kawada

[11] 3,941,702
[45] Mar. 2, 1976

[54] ROTARY STRAINER
[75] Inventor: Mitsuo Kawada, Toyota, Japan
[73] Assignee: Kito Machine Industries Company Limited, Japan
[22] Filed: Nov. 14, 1974
[21] Appl. No.: 523,818

[52] U.S. Cl. .............................. 210/391; 210/403
[51] Int. Cl.² ........................................ B01D 35/16
[58] Field of Search ........... 210/391, 394, 403, 407, 210/408, 410

[56] References Cited
UNITED STATES PATENTS

| 72,254 | 12/1967 | Winants et al. | 210/403 |
| 252,796 | 1/1882 | Phillips | 210/403 X |
| 1,712,258 | 5/1929 | Compain | 210/394 |
| 2,758,722 | 8/1956 | Murray | 210/403 X |
| 2,798,609 | 7/1957 | Smith et al. | 210/403 UX |
| 2,891,671 | 6/1959 | Nilsson | 210/403 X |
| 3,275,150 | 9/1966 | Tait | 210/394 X |
| 3,278,039 | 10/1966 | Nilsson | 210/403 |

FOREIGN PATENTS OR APPLICATIONS
1,093,177  5/1955  France .............................. 210/403

Primary Examiner—Theodore A. Granger
Attorney, Agent, or Firm—James C. Wray

[57] ABSTRACT

A filter is spread over each side of the strainer casing rotated by a horizontal driving shaft, and a plurality of radially extending partition plates are provided in the inside peripheral part of said casing, whereby alien matter such as sludge contained in the liquid supplied into said casing is separated by said filters. The alien matter such as sludge remaining in the casing is moved upwardly with rotation of the casing and then dropped gravitationally into a chute-like passage and thereby discharged out of the casing.

3 Claims, 3 Drawing Figures

ROTARY STRAINER

BACKGROUND OF THE INVENTION

This invention relates to a rotary strainer which is capable of always effectively and efficiently separating the mixture liquid of sludge such as cuttings and detergent or wash oil used for washing and cleaning, for example, machined works.

Filters are generally used for separating alien substances such as sludge from a liquid in which such alien substances are contained. However, if alien substances are contained in great quantity in the liquid, the filter could be fouled in a short time, resulting in a reduced filtering performance and unsatisfactory separating effect.

BRIEF SUMMARY OF THE INVENTION

It is therefore an object of the present invention to provide a rotary strainer which is capable of separating mixture liquids from alien substances such as sludge contained therein at extremely high efficiency.

Another object of the present invention is to provide a device whereby the alien substances such as sludge adhering to the filters can be perfectly removed.

Other objects of the present invention will become apparent from the following detailed description of the invention as given with reference to the accompanying drawings.

DETAILED DESCRIPTION OF INVENTION

Figure 1:
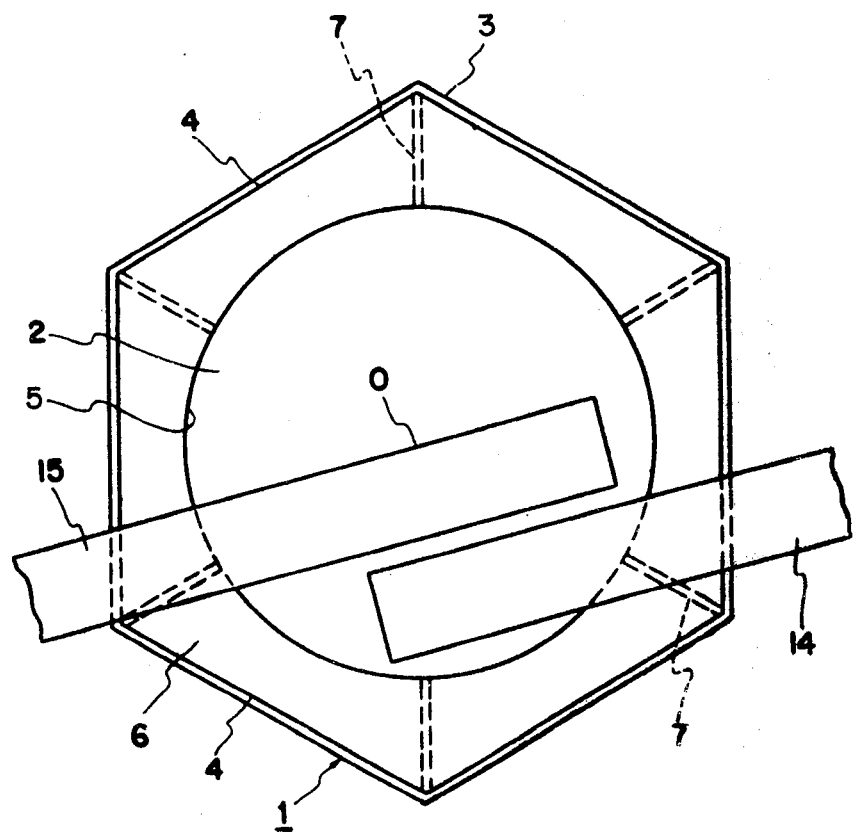
FIG. 1 is a front view of a rotary strainer according to an embodiment of the present invention.
Figure 2:
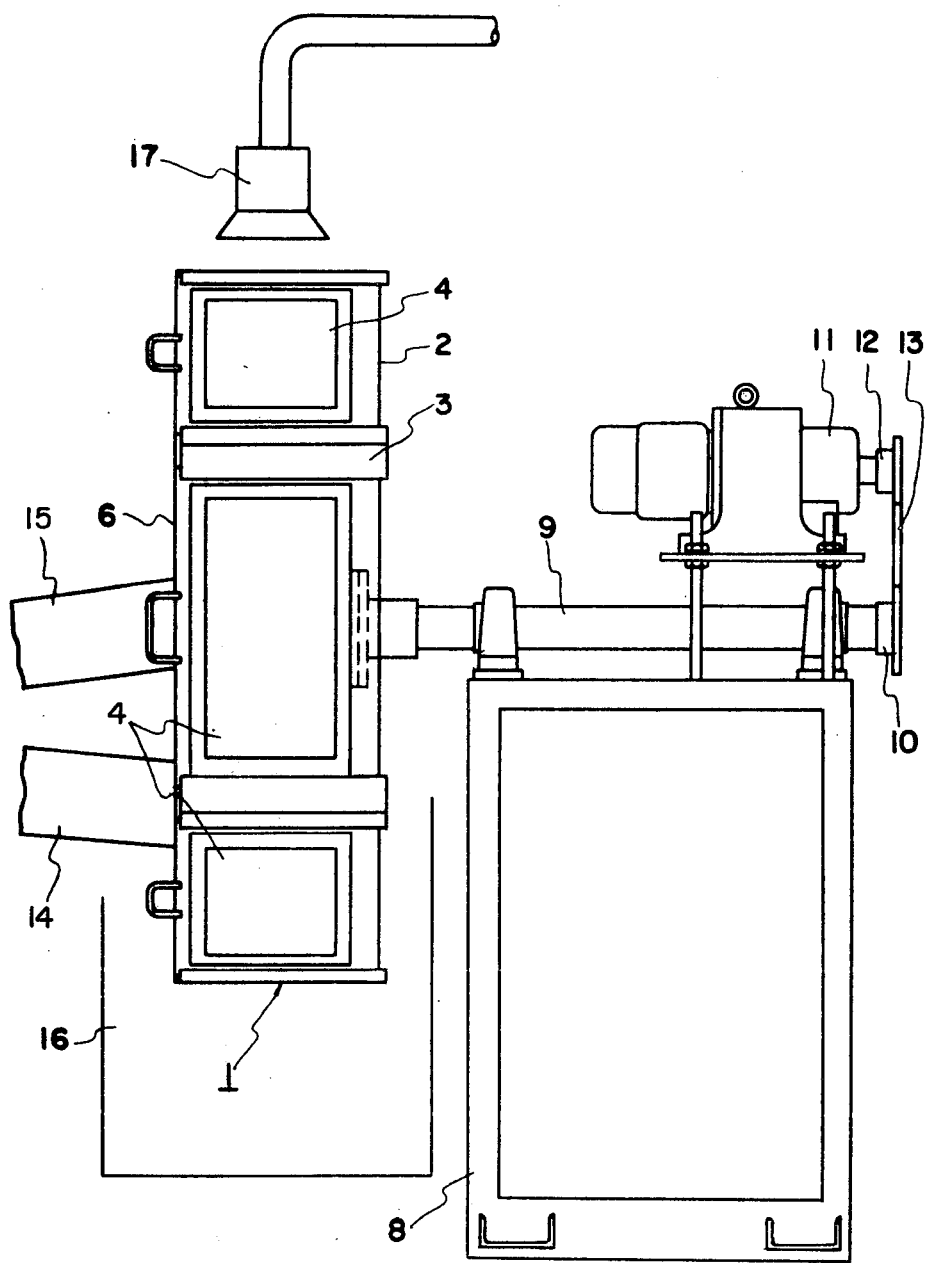
FIG. 2 is a side elevation.
Figure 3:
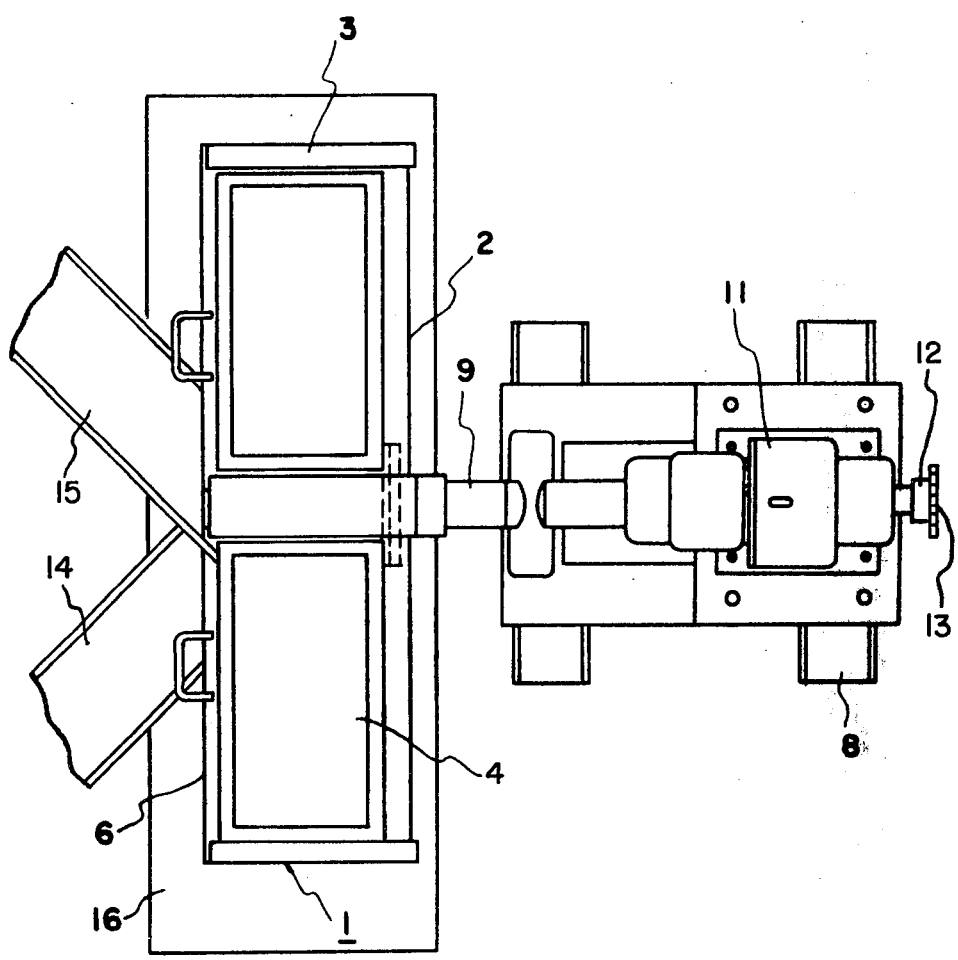
FIG. 3 is a plane view.

Referring to the drawings, there is shown a hexagonal strainer, generally designated by the numeral 1, which consists of a hexagonal casing 3 having filters 4, 4, . . . spread over the respective peripheral sides thereof, a plate 6 mounted over the front side of the casing 3, said plate 6 being formed with a circular opening 5, a base plate 2 mounted over the rear side of said casing 3, and a plurality of partition plates 7, 7, . . . disposed between said plate 6 and said base plate 2 and extending toward the centre 0 of the casing 3.

The outer end face of the base plate 2 of the strainer 1 is fixed to an end of a driving shaft 9 arranged horizontally on the underframe 8, and a sprocket 10 is secured to the other end of said shaft 9. A chain 13 is passed round said sprocket 10 and round a sprocket 12 mounted at the end of the revolving shaft of a prime mover 11 so that said strainer 1 may be rotated with the driving of said prime mover 11.

Also, a trough- or chute-like passage 14 for supplying the mixture of sludge and washing liquid and another similar passage 15 disposed above said passage 14 for discharging sludge are provided extending into the casing 3 through said opening 5. It is to be noted that these passages 14 and 15 are provided with opposed gradients relative to each other so as to allow a smooth supply of mixture liquid and smooth discharge of sludge.

Above the topmost outer periphery of the strainer 1 is provided an air nozzle 17 adapted for forcibly removing sludge adhering to the filters 4. The numeral 16 denotes a washing liquid tank in which the washing liquid passing through the filters 4 is reservoired.

In operation of the present device, the prime mover 11 is driven to rotate the strainer 1 at a speed of for instance 1 r.p.m. while the mixture liquid of sludge and washing liquid discharged from a washing machine (not shown) is supplied into the lower portion of the strainer 1 through said passage 14, whereby said mixture liquid is separated from sludge by the filters 4. Sludge is left in the strainer 1 while the filtered washing liquid flows down into the reservoir tank 16 in the manner described above. Sludge left in the strainer 1 is gradually moved upwardly with the rotation of the strainer and tends to fall down owing to the force of gravity, but such falling is obstructed by the partition plates 7. However, the strainer 1 keeps on rotating and therefore when a particular partition plate 7 is raised above the horizontal plane passing the centre 0 of the casing 3, sludge on said particular partition plate is urged to fall down along its surface to finally drop into the chute-like passage 15. The sludge which dropped into said passage 15 is forced to move downwardly owing to the falling gradient of the passage and is thus discharged out.

A certain portion of sludge may not fall down gravitationally and will stay adhering to the filters, but such sludge is forcibly removed, by a high pressure air jet from the air nozzle 17 when any of the filters passes the highest point of the assembly, so that each and every filter 4 is kept perfectly free of fouling.

What is claimed is:

1. A rotary strainer comprising a box-like casing having a plurality of angularly related sides and a like plurality of filters mounted on the sides, a first closed rear plate perpendicularly connected to the sides, and a front plate perpendicularly joined to the sides parallel to the rear plate, the front plate having a central opening, and the rear plate being secured to and rotated by a horizontally driving shaft, a like plurality of partition plates provided in said casing and secured to the sides and the front and rear plates and extending between the plates and from intersections of adjacent filters radially inward in the casing to the opening in the front plate, the plates having inner edges extending rearward from the opening, and the plates thereby extending toward the center of said casing from said respective filters, supply means extending from outside of the casing centrally through the opening into the casing and terminating above a filter in a lower most position for supplying a mixture liquid containing alien substances such as sludge into said casing, and onto the filters and discharge means extending from outside the casing through a lateral position of the opening and rearward beneath inner edges of the partition plates, for receiving alien substance from inner edges of rising partition plates and discharging said alien substances out of said casing.

2. A rotary strainer as set forth in claim 1, wherein said casing is polygonal.

3. A rotary strainer as set forth in claim 1, wherein an air nozzle adapted for forcibly removing alien matters such as sludge adhering to said filters is provided above the topside peripheral portion of said casing.

* * * * *